(12) United States Patent
Buse

(10) Patent No.: US 7,520,763 B1
(45) Date of Patent: Apr. 21, 2009

(54) TRACK LIGHTING SYSTEM WITH DEPENDENT LAMP CORD

(75) Inventor: John Jeffrey Buse, Mooreville, MS (US)

(73) Assignee: Genlyte Thomas Group LLC, Louisville, KY (US)

( * ) Notice: Subject to any disclaimer, the term of this patent is extended or adjusted under 35 U.S.C. 154(b) by 0 days.

(21) Appl. No.: 11/771,294

(22) Filed: Jun. 29, 2007

(51) Int. Cl.
H01R 25/00 (2006.01)
(52) U.S. Cl. ..................................... 439/121
(58) Field of Classification Search ............... 439/121, 439/404, 430; 362/404, 430
See application file for complete search history.

(56) References Cited

U.S. PATENT DOCUMENTS

| | | | |
|---|---|---|---|
| 785,483 A | 3/1905 | Feighner |
| 1,257,032 A | 2/1918 | Sheperd |
| 1,689,019 A | 10/1928 | Fullerton et al. |
| 1,714,110 A | 5/1929 | Sprecher |
| RE17,345 E | 7/1929 | Berger |
| 1,768,255 A | 6/1930 | Jaffe |
| 1,792,260 A | 2/1931 | Werner |
| 1,818,163 A | 8/1931 | Samuelson |
| 1,885,513 A | 11/1932 | Mask |
| 1,901,366 A | 3/1933 | Flynn |
| 2,026,884 A | 1/1936 | Glasgow |
| 2,209,008 A | 7/1940 | Sutherland |
| 2,420,208 A | 5/1947 | Solomon |
| 2,856,592 A | 10/1958 | Carlson |
| 2,946,037 A | 7/1960 | Platz et al. |
| 3,070,690 A | 12/1962 | Horn |
| 3,120,985 A | 2/1964 | Hubbell |
| 3,259,739 A | 7/1966 | Guth |
| 3,273,103 A | 9/1966 | Ericson |
| 3,391,377 A | 7/1968 | Corl et al. |
| 3,529,275 A | 9/1970 | Routh |
| 3,559,146 A | 1/1971 | Valtonen |
| 3,622,938 A | 11/1971 | Masamichi et al. |
| 3,646,501 A | 2/1972 | Valtonen |
| 3,686,614 A | 8/1972 | Hyrylainen |
| 3,718,886 A | 2/1973 | Hoffmeister |
| 3,757,273 A | 9/1973 | Hesse |
| 3,760,133 A | 9/1973 | Howard |
| 3,832,503 A | 8/1974 | Crane |
| 3,848,715 A | 11/1974 | Hesse |
| 3,884,541 A | 5/1975 | O'Nan et al. |
| 3,894,781 A | 7/1975 | Donato |
| 3,933,403 A | 1/1976 | Rubesamen et al. |
| 3,980,368 A | 9/1976 | Fremont |
| 3,993,385 A | 11/1976 | Seger |
| 4,029,378 A * | 6/1977 | Bolis ........................... 439/94 |
| 4,032,208 A * | 6/1977 | Berkenhoff ................. 439/122 |
| 4,032,775 A | 6/1977 | Bobrick et al. |
| 4,053,194 A | 10/1977 | Gilman |

(Continued)

Primary Examiner—Hae Moon Hyeon
Assistant Examiner—Vladimir Imas
(74) Attorney, Agent, or Firm—Chad D. Bruggerman; Middleton Reutlinger

(57) ABSTRACT

A track lighting system which supports compact fluorescent lamp fixtures removably attached to a track member by a track adaptor. Compact fluorescent lamp fixture depends from a track adaptor by an adjustable suspended cable. Suspended cable provides electricity and mechanical support to a compact fluorescent socket and lamp. The track adaptor may also accommodate line voltage fixtures and allows a user to adjust the suspended cable by cutting the cable, stripping internal cable wires, then inserting internal wires into the track adaptor cavities and securing with securing screws.

22 Claims, 6 Drawing Sheets

U.S. PATENT DOCUMENTS

| | | | |
|---|---|---|---|
| 4,085,988 A | 4/1978 | Gamble | |
| 4,097,919 A | 6/1978 | Bobrick et al. | |
| 4,108,523 A * | 8/1978 | Bolis | 439/116 |
| 4,139,525 A | 2/1979 | Bacskai | |
| 4,181,388 A | 1/1980 | Donato | |
| 4,200,862 A | 4/1980 | Campbell et al. | |
| 4,211,460 A | 7/1980 | Seelbach et al. | |
| 4,218,108 A | 8/1980 | El Mouchi | |
| 4,289,365 A | 9/1981 | Rutgers | |
| 4,375,106 A | 2/1983 | Voll | |
| 4,392,187 A | 7/1983 | Bornhorst | |
| 4,508,400 A | 4/1985 | Herbert | |
| 4,533,190 A | 8/1985 | Booty | |
| 4,557,547 A | 12/1985 | Stuart | |
| 4,598,345 A | 7/1986 | Kleeman | |
| 4,655,520 A | 4/1987 | Cummings | |
| 4,676,567 A | 6/1987 | Mouchi | |
| 4,684,822 A | 8/1987 | Angott | |
| 4,688,154 A | 8/1987 | Nilssen | |
| 4,699,439 A * | 10/1987 | Cohen | 439/207 |
| 4,712,167 A | 12/1987 | Gordin et al. | |
| 4,722,030 A | 1/1988 | Bowden | |
| 4,779,168 A | 10/1988 | Montgomery | |
| 4,790,766 A | 12/1988 | Booty, Sr. et al. | |
| 4,797,795 A | 1/1989 | Callahan | |
| 4,822,292 A * | 4/1989 | Thayer et al. | 439/207 |
| 4,861,273 A | 8/1989 | Wenman et al. | |
| 4,887,196 A | 12/1989 | Brown et al. | |
| 4,947,302 A | 8/1990 | Callahan | |
| 4,968,262 A | 11/1990 | Widell et al. | |
| 5,013,251 A * | 5/1991 | Stringer et al. | 439/94 |
| 5,031,082 A | 7/1991 | Bierend | |
| 5,038,261 A | 8/1991 | Kloos | |
| 5,055,746 A | 10/1991 | Hu et al. | |
| 5,072,216 A | 12/1991 | Grange | |
| 5,151,038 A | 9/1992 | Range et al. | |
| 5,176,442 A | 1/1993 | Richardson | |
| 5,192,126 A | 3/1993 | Remeyer et al. | |
| 5,209,560 A | 5/1993 | Taylor et al. | |
| 5,273,452 A | 12/1993 | Donato et al. | |
| 5,329,431 A | 7/1994 | Taylor et al. | |
| 5,334,037 A * | 8/1994 | Gabrius et al. | 439/118 |
| 5,336,097 A | 8/1994 | Williamson, Jr. et al. | |
| 5,347,431 A | 9/1994 | Blackwell et al. | |
| 5,382,947 A | 1/1995 | Thaler et al. | |
| 5,406,176 A | 4/1995 | Sugden | |
| 5,448,460 A | 9/1995 | Belfer et al. | |
| 5,452,187 A | 9/1995 | Belfer et al. | |
| 5,483,432 A | 1/1996 | Wang | |
| 5,502,627 A | 3/1996 | Hunt et al. | |
| 5,506,715 A | 4/1996 | Zhu | |
| 5,526,245 A | 6/1996 | Davis et al. | |
| 5,554,979 A | 9/1996 | Kohar et al. | |
| 5,593,224 A | 1/1997 | Kunkel et al. | |
| 5,637,964 A | 6/1997 | Hakkarainen et al. | |
| 5,731,664 A | 3/1998 | Posa | |
| 5,751,117 A | 5/1998 | Abbott | |
| 5,769,531 A | 6/1998 | Hunt et al. | |
| 5,803,755 A | 9/1998 | Kuchar et al. | |
| 5,855,485 A | 1/1999 | Patti | |
| 5,921,659 A | 7/1999 | Hunt et al. | |
| 5,938,362 A | 8/1999 | Bastiansen | |
| 5,988,838 A | 11/1999 | Rudenberg | |
| 5,989,067 A | 11/1999 | Morgan et al. | |
| 6,004,005 A | 12/1999 | Demshki, Jr. | |
| 6,032,432 A | 3/2000 | Patti | |
| 6,056,561 A * | 5/2000 | Lin | 439/121 |
| 6,059,582 A * | 5/2000 | Tsai | 439/121 |
| 6,079,992 A | 6/2000 | Kuchar et al. | |
| 6,120,262 A | 9/2000 | McDonough et al. | |
| 6,127,925 A | 10/2000 | Bonsignore et al. | |
| 6,130,412 A | 10/2000 | Sizemore | |
| 6,152,583 A | 11/2000 | Langner | |
| 6,163,275 A | 12/2000 | Hartzell | |
| 6,169,377 B1 | 1/2001 | Bryde et al. | |
| 6,174,073 B1 | 1/2001 | Regan et al. | |
| 6,192,282 B1 | 2/2001 | Smith et al. | |
| 6,200,008 B1 | 3/2001 | Bucher et al. | |
| 6,220,721 B1 | 4/2001 | Chan et al. | |
| 6,273,587 B1 * | 8/2001 | Demshki | 362/249 |
| 6,439,749 B1 | 8/2002 | Miller et al. | |
| D463,055 S * | 9/2002 | Layne et al. | D26/63 |
| 6,517,224 B2 * | 2/2003 | Zakerzewski | 362/430 |
| 6,543,957 B1 * | 4/2003 | Raspotnig | 403/286 |
| 6,567,032 B1 | 5/2003 | Mullaly et al. | |
| 6,585,529 B2 * | 7/2003 | Zakerzewski | 439/110 |
| RE38,259 E | 10/2003 | Kuchar et al. | |
| 6,634,895 B2 * | 10/2003 | Agro | 439/121 |
| 6,655,817 B2 | 12/2003 | Devlin et al. | |
| 6,687,487 B1 | 2/2004 | Mosebrook et al. | |
| 6,843,581 B2 | 1/2005 | Mier-Langner et al. | |
| 6,866,396 B2 * | 3/2005 | Ward | 362/220 |
| 6,884,095 B1 * | 4/2005 | Tsai | 439/121 |
| 7,018,072 B2 | 3/2006 | Mier-Langner et al. | |
| 7,024,119 B1 | 4/2006 | Mier-Langner et al. | |
| 7,027,736 B1 | 4/2006 | Mier-Langner et al. | |
| 7,111,957 B2 | 9/2006 | Bernhart et al. | |
| 7,140,888 B1 * | 11/2006 | Chan | 439/119 |
| 7,172,332 B2 | 2/2007 | Mobarak et al. | |
| 2001/0040805 A1 * | 11/2001 | Lansing et al. | 362/276 |
| 2002/0045369 A1 * | 4/2002 | Agro | 439/121 |
| 2005/0146899 A1 | 7/2005 | Joseph et al. | |
| 2005/0169015 A1 | 8/2005 | Luk et al. | |
| 2005/0207173 A1 * | 9/2005 | Benghozi et al. | 362/404 |

* cited by examiner

TRACK LIGHTING SYSTEM WITH DEPENDENT LAMP CORD

FIELD OF INVENTION

The present invention is related generally to track lighting systems and more specifically to track lighting systems which contain adjustable suspended cables that provide mechanical and electrical support to a lamp fixture and accompanying accessories of the lamp fixture.

DESCRIPTION OF RELATED ART

Various track lighting systems have been proposed in the art. There is a need, however, for a track lighting system capable of supporting a compact fluorescent lamp suspended on an adjustable cable depending from a ballast housing and track adapter received on a track member. Additionally, there is a need for a track adaptor to allow for the electrical cables to be easily adjustable in length and reconnected to the adaptor in the field to accommodate a particular vertical placement of the lights. Existing methods of adjusting the cables are laborious and often involve disconnecting several screws or other retaining devices to disassemble the track connector. Moreover, once disassembled, the track connector oftentimes contains a plurality of loose pieces and does not always provide for an easy method of reattaching electrical cables that have been adjusted. It is thereby desirable to provide an easier, more effective method of adjusting the cables in the field.

SUMMARY OF THE INVENTION

The present invention allows a user in the field to easily adjust the length of a suspended cable that depends from a track adaptor removably connected to a rail member. The rail member is connected to a power source and it, along with the track adaptor and suspended cable, electrically support and may mechanically support a light fixture and any accompanying accessories. A plurality of light fixtures can be connected to the rail member by means of the track adaptor and suspended cable. The track adaptor of the present invention is also capable of removably receiving a transformer or ballast housing, which contains a transformer or ballast that can receive electrical input from the track adaptor and provide appropriate electrical output to a suspended cable depending from the ballast housing to power a compact fluorescent lamp.

Therefore, a general object of this invention is to provide a track adaptor that allows a suspended cable depending from the adaptor to be easily detached, adjusted, and reattached by a user in the field.

An additional object of this invention is to provide a variety of different quantities, shapes, sizes, and types of fixtures utilizing compact fluorescent lamps which depend by a cord from a track member.

Other objects and advantages of this invention will become apparent from the following description taken in connection with the accompanying drawings, wherein is set forth by way of illustration and examples, embodiments of this invention.

DETAILED DESCRIPTION

Figure 1:
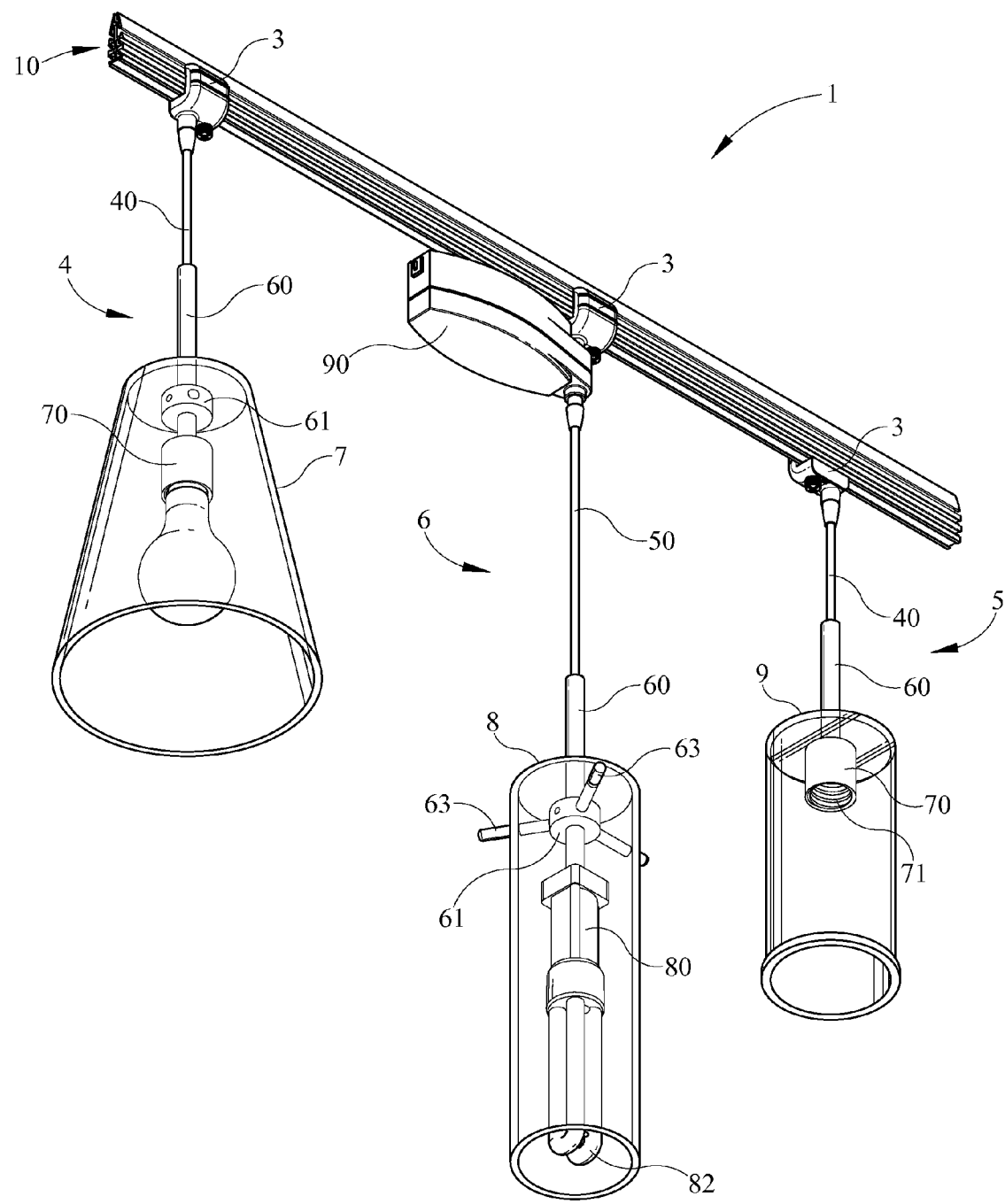
FIG. 1 is a bottom perspective view of a track lighting system.

A track lighting system 1 of the present invention is generally depicted in FIG. 1. Track lighting system 1 comprises one or more connected rail members 10 and one or more track light fixtures 4, 5, and 6. Line voltage track light fixtures 4 and 5 of the track lighting system consist of a track connector or adaptor 3 for mechanically and electrically connecting the fixtures to rail member 10. Additionally, line voltage fixtures 4 and 5 each have a depending cable 40 connected to a track adaptor 3. The cable and track adaptor provide mechanical support for a line voltage socket housing 70 and line voltage socket 71 and supply power to line voltage socket 71, both attached to the distal end of a depending cable 40 attached track adaptor 3. Depending cable 40 can also mechanically support the weight of one or more accessories such as shades 7 and 9. Shades 7 and 9 depicted in FIG. 1 are merely illustrative and are not meant to limit the types of accessories capable of being supported by depending cable 40. Accessories could include, without limitation, pendants or shades of various shapes and sizes constructed of glass, aluminum, plastic, steel, and the like. Track adaptor 3 allows each depending cable 40 supporting line voltage light fixtures 4 and 5 to be easily detached, adjusted, and reattached by a user in the field.

Figure 5:
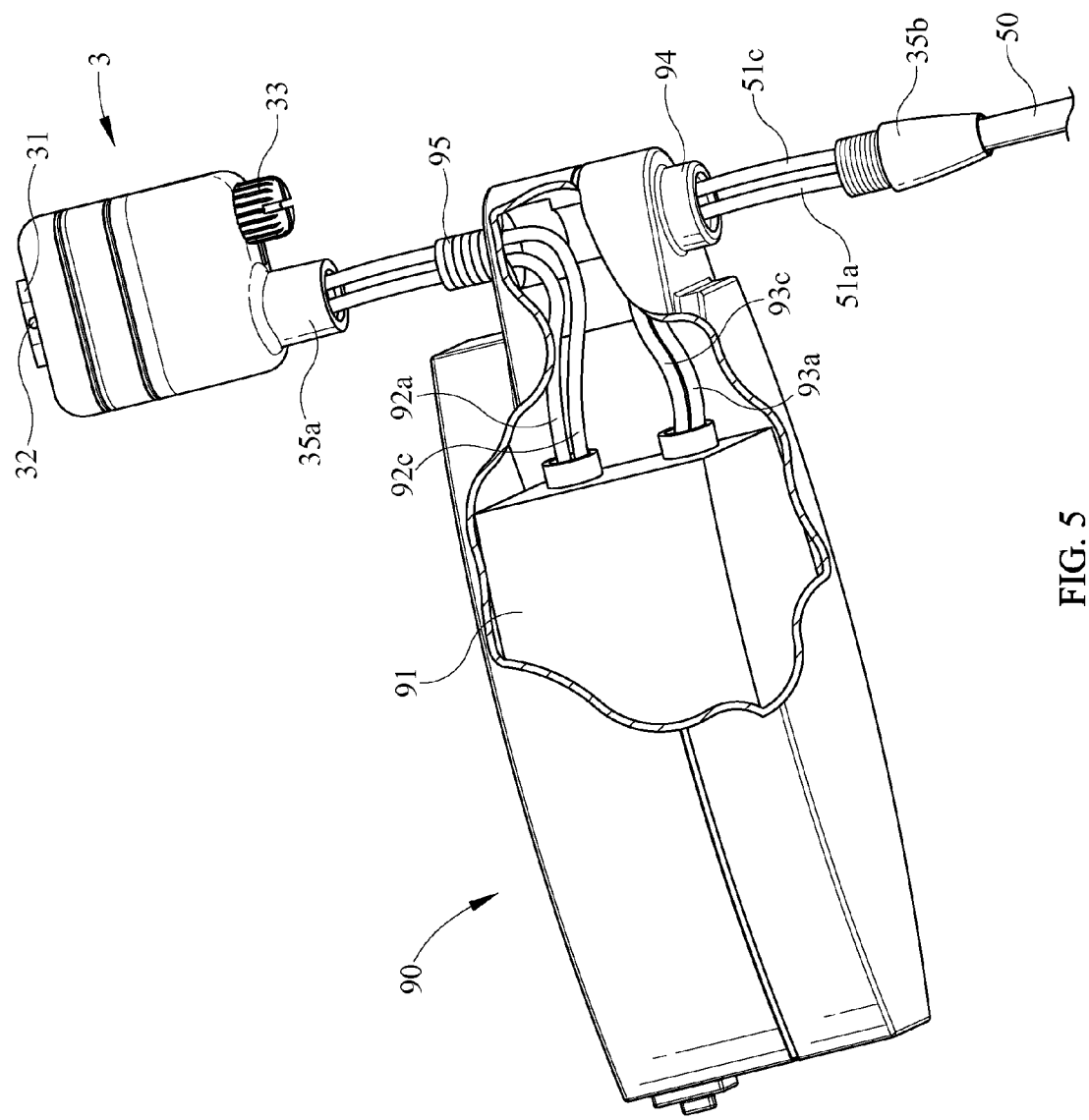
FIG. 5 is an enlarged, side view of another embodiment of a track lighting system with the housing and cord exploded away and the electrical ballast housing partially broken away.

A compact fluorescent light fixture 6 is similarly mechanically and electrically connected to rail member 10 by means of a track adaptor 3. Compact fluorescent light fixture 6 also comprises a transformer or ballast housing 90, which, as shown in FIG. 5, contains a transformer or ballast 91 and which is removably mechanically attached to track adaptor 3. Ballast 91 receives electrical input from rail member 10 through track adaptor 3 and provides appropriate electrical output to power a compact fluorescent bulb 82. A depending cable 50 is operably engaged to ballast housing 90 and transmits the output of ballast 91 to compact fluorescent lighting socket housing 80. A compact fluorescent lighting socket 81, shown in FIG. 6, forms a part of compact fluorescent lighting socket housing 80 and is located at the distal end of cable 50 from track adaptor 3 and electrical ballast housing 90. Compact fluorescent lighting socket 81 is capable of receiving a compact fluorescent bulb, such as, but not limited to, compact fluorescent bulb 82 shown in FIG. 1. Depending cable 50 can also mechanically support the weight of one or more accessories, such as, but not limited to, pendants or shades constructed from plastic, glass, silver, aluminum, and the like. Although compact fluorescent lamp fixture 6 is shown in a particular embodiment in FIG. 1, it is merely representative of one design that can embody the invention. There are a variety of different quantities, shapes, sizes, and types of fixture designs that may be used. For example, a compact fluorescent lamp may be adjusted or rotated simultaneously with a reflector housing at the distal end of the cord at various angles thus allowing the light beam to be aimed in a desired direction.

Figure 4:
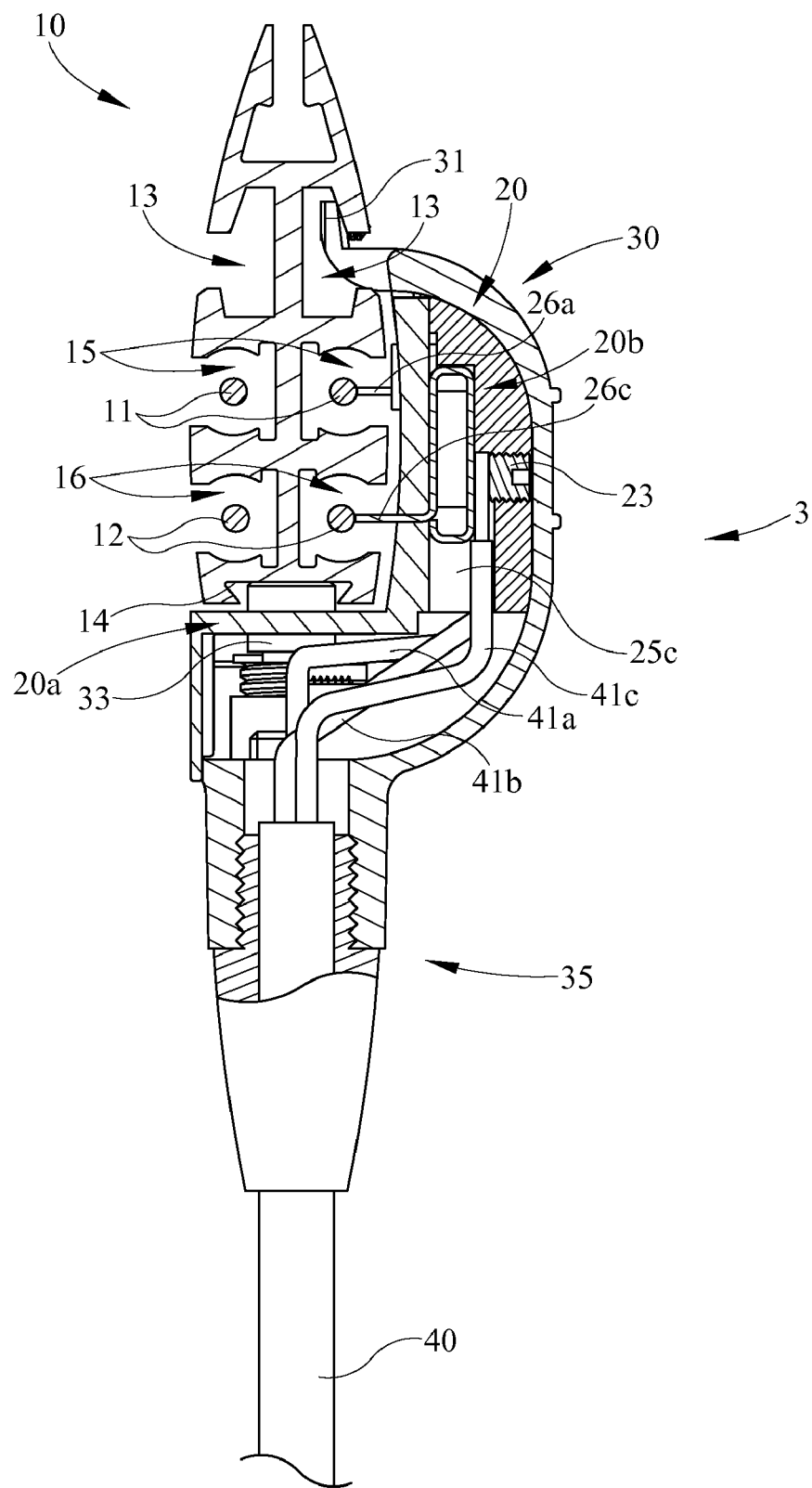
FIG. 4 is a partial sectional view of the assembled track adaptor of FIG. 2 taken along line 4-4 and engaging a track member.

The rail member 10, shown in FIG. 1, is mountable to a wall or ceiling through use of mounting brackets or other means and is electrically connected to a standard 120V/60 Hz power supply (not shown) by feeds connected to an electrical junction box or by other known means. Rail member 10 may be constructed to be hand bendable in the lateral direction and can be attached to other rail members or shortened in the field to create rails of various shapes and lengths. As shown in FIG. 4, rail member 10 contains two electrical hot conductors 11 on opposed sides and two electrical neutral conductors 12 on opposed sides, thus providing pairs of electrical hot and neutral conductors on each side of rail member 10. Rail member 10 is designed to allow the conductors on each side to be powered by a different electrical circuit. Electrical conductors 11 and 12 are partially enclosed by an insulating material within track receiving areas 15 and 16 for safety. Track receiving areas 15 and 16 allow the contact blades 26a and 26c of track adaptor 3 to engage and electrically contact the conductors 11 and 12. In this particular embodiment the top electrical conductors 11 are connected to the electrical hot of the power supply and bottom electrical conductors 12 are connected to the electrical neutral of the power supply. Although in this particular embodiment top track receiving areas 15 provide access to the conductors providing an electrical hot and the bottom track receiving areas 16 provide access to the conductors providing an electrical neutral, it is apparent the present invention could alternatively be designed with top track receiving areas 15 providing access to the neutral conductors and bottom track receiving areas 16 providing access to the hot conductors.

Figure 2:
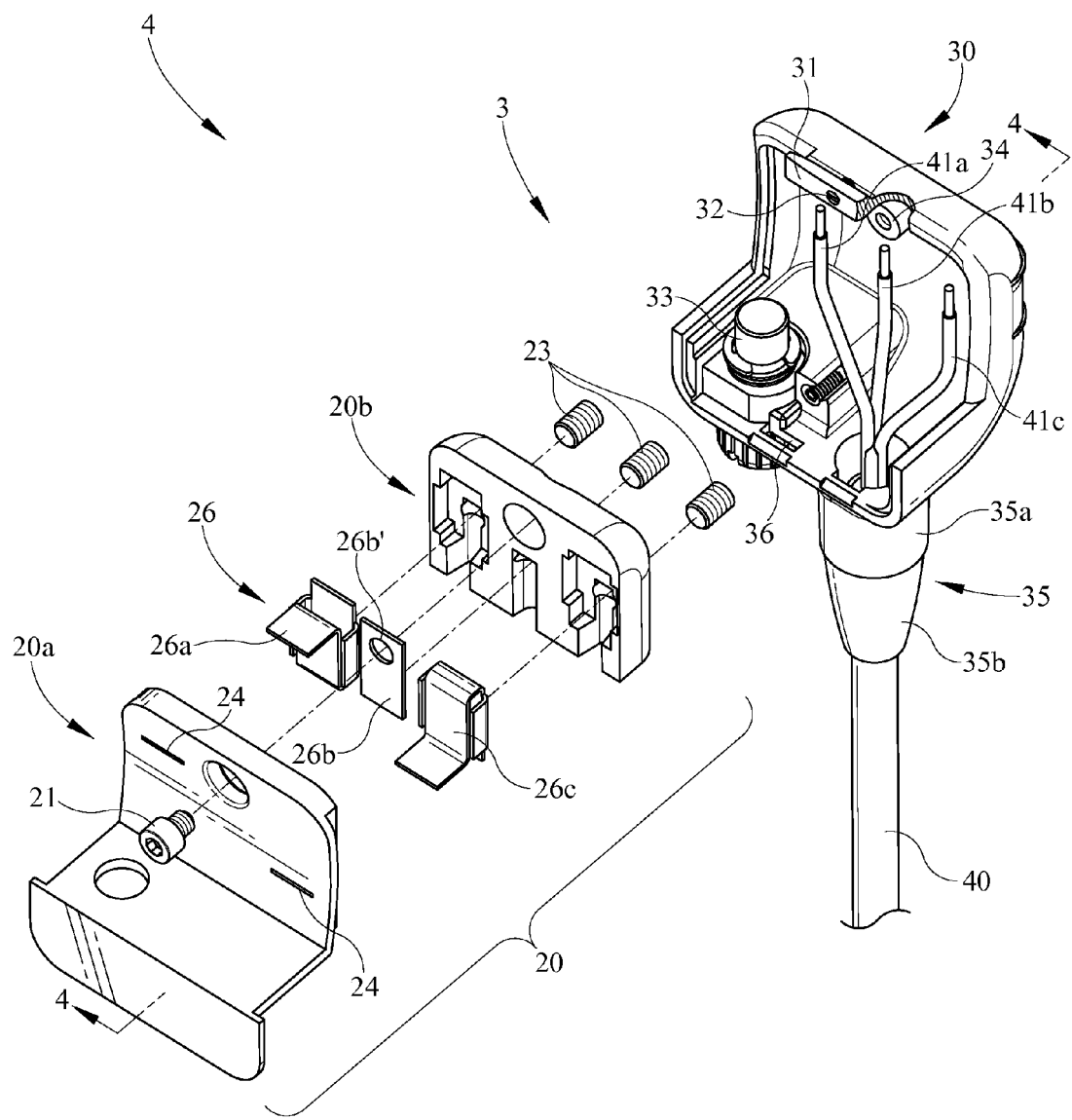
FIG. 2 is an enlarged, top perspective view of an adaptor of the track lighting system of FIG. 1 with the housing exploded away.

Referring now to FIG. 2 and FIG. 4, track connector 3 is designed to be removably connected mechanically and electrically to rail member 10 and preferably comprises a plastic housing 20 and a metal housing 30. The assembled plastic housing 20 is substantially S-shaped in cross section and is releasably affixed to metal housing 30. A member 22, shown in FIG. 3, protrudes from plastic housing 20 and is removably received in notch 36 to secure plastic housing 20 to metal housing 30. As is shown in FIG. 2, plastic housing 20 of track connector 3 is additionally affixed to metal housing 30 by a screw 21, which engages socket 34. Lower metal contact blade 26c and upper metal contact blade 26a, which are constructed from a bendable conductive metal, are substantially enclosed in plastic housing 20. Portions of the blades 26a and 26c extend out of plastic housing 20a through blade slots 24 (FIG. 2) and, as shown in FIG. 4, protrude into track receiving areas 15 and 16 of rail member 10 to make contact with track conductors 11 and 12 when track adaptor 3 is mounted on rail member 10. Protruding from the top portion of metal housing 30 of track adaptor 3 is a ground contact protrusion 31, which is constructed to be receivable in a ground receiving notch 13 located in pairs on both sides of rail member 10 above receiving area 15. Ground receiving notch 13 is connected with an electrical ground from the power source. Ground contact protrusion 31 is also designed to help secure track connector 3 to rail member 10 when it is captured in ground receiving notch 13. To ensure ground contact protrusion 31 is in electrical contact with ground receiving notch 13, a ground contact screw 32 in protrusion 31, shown in FIG. 2 may be adjusted to contact the wall of ground receiving notch 13 and contains a sharp point able to pierce through paint or light debris that may be present in ground receiving notch 13. Preferably, metal thumbscrew 33 protrudes downwardly from track adaptor 3 and is removably received in threading of metal housing 30. Large metal thumbscrew 33 is constructed to provide compressive force against the bottom recessed portion 14 of rail member 10 when tightened, which helps maintain track adaptor 3 in position when the track adaptor 3 is in its attached position. Metal thumbscrew 33 works in combination with ground contact protrusion 31 and protruding portions of upper metal contact blade 26a and lower metal contact blade 26c to securely affix track adaptor 3 to rail member 10 as depicted in FIG. 4. This occurs by first inserting ground contact protrusion 31 into ground receiving notch 13 on either side of rail member 10, then applying force against metal housing 30 to push upper metal contact blade 26a and lower metal contact blade 26c into top and bottom receiving areas 15 and 16 on either side of rail member 10 and into contact with electrical conductors 11 and 12, and finally tightening large metal thumbscrew 33 until it firmly secures track adaptor 3 to rail member 10.

As depicted in FIGS. 2 and 4, the rear portions of lower metal contact blade 26c and upper metal contact blade 26a are secured within plastic housing 20. As further shown in FIGS. 2 and 4, lower metal contact blade 26c and upper metal contact blade 26a are interposed between front plastic housing 20a and rear plastic housing 20b, which are joined together through, for example, sonic welding, or by other joining means to form plastic housing 20. As can be seen most clearly in FIG. 2, upper and lower contact blades 26a and 26c are electrically isolated from each other as a result of being separated by the insulating material of plastic housing 20. Also shown in FIG. 2 is a ground contact blade 26b, which is also substantially enclosed in plastic housing 20, and contains an aperture 26b' for receipt of securing screw 21. A portion of ground contact blade 26b around aperture 26b' is in contact with metal securing screw 21, which also makes contact with socket 34 of metal housing 30 when securing screw 21 has secured plastic housing 20 to metal housing 30. As a result of the contacts described above, ground contact blade 26b, metal securing screw 21, and metal housing 30 are all electrically grounded when ground contact protrusion 31 of metal housing 30 is received in ground receiving notch 13 of rail member 10. Similarly, lower metal contact blade 26a and upper metal contact blade 26b make electrical neutral and hot connections respectively when track connector 3 is attached to rail member 10 and power is supplied to rail member 10. This is a result of the portions of the contact blades protruding through blade slots 24 being in contact with conductors 11 and 12 on either side of rail member 10 when track adaptor 3 is attached to rail member 10.

Figure 3:
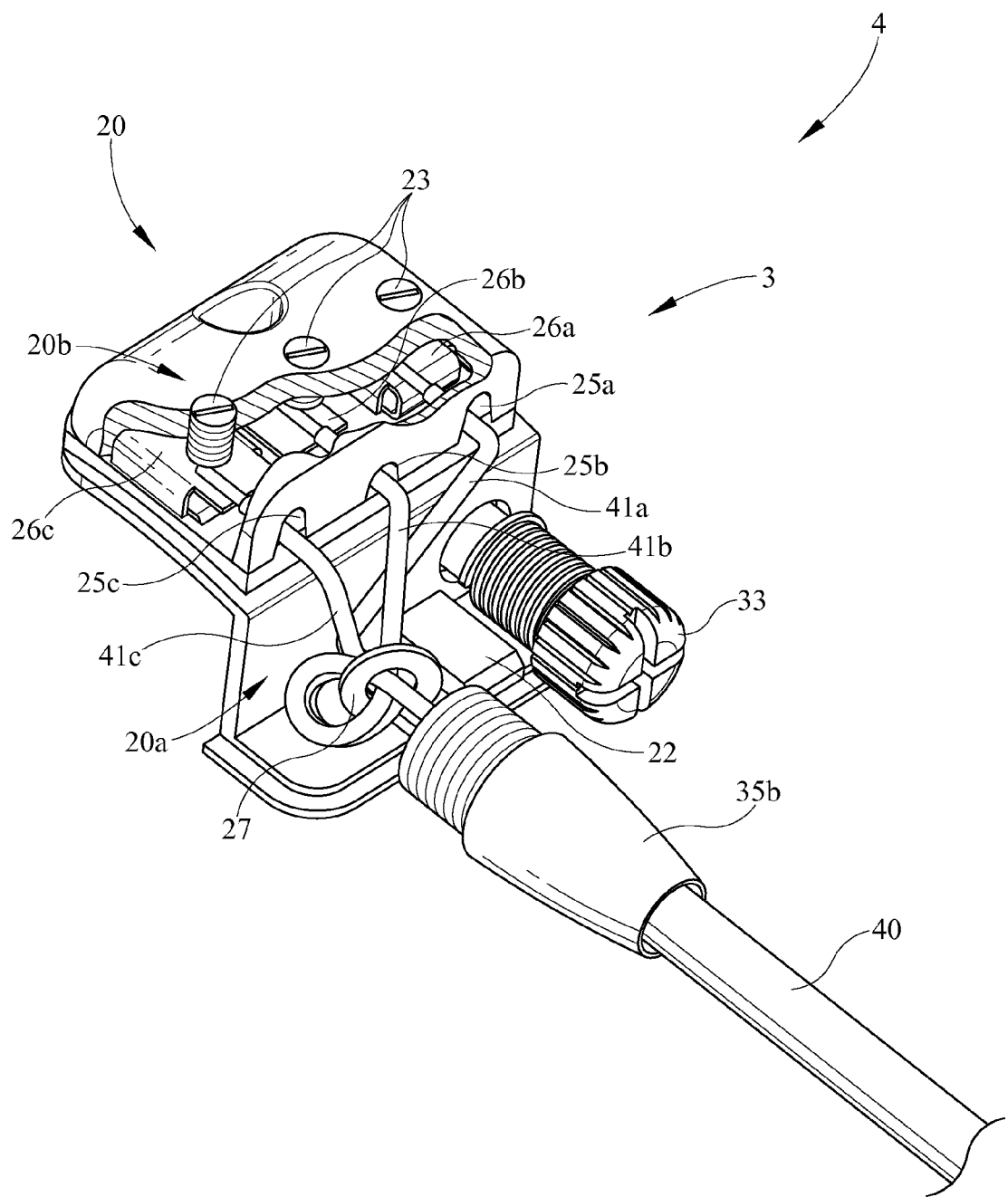
FIG. 3 is an enlarged, bottom perspective view of the track adaptor having the plastic housing partially broken away and portions of the metal housing broken away.

As shown in FIG. 3 wire receiving cavities 25a, 25b, and 25c are located on the bottom portion of plastic housing 20 between front plastic housing 20a and rear plastic housing 20b. The location of neutral wire receiving cavity 25c corresponds to the location of lower metal contact blade 26c, ground wire receiving cavity 25b corresponds to the location of ground metal contact blade 26b, and hot wire receiving cavity 25a corresponds to the location of upper metal contact blade 26a. Alternatively, the location of neutral wire receiving cavity 25c could correspond to the location of upper metal contact blade 26a and the location of hot wire receiving cavity 25a could correspond to the location of lower metal contact blade 26c to correctly interface with a different embodiment of track member 10. Wire receiving cavities 25a, 25b, and 25c are designed to allow access to each of their corresponding contact blades 26a, 26b, and 26c while preventing contact with adjacent contact blades. The plastic molding that comprises receiving cavities 25a, 25b, and 25c electrically isolates each cavity and corresponding contact blade from the other contact blades. Wire receiving cavities 25a, 25b, and 25c are designed to receive a stripped portion of corresponding electrical wiring from depending cable 40 when plastic securing screws 23 are loosened or removed. This allows for a ground wire 41b to be received in ground receiving cavity 25b, a hot or line wire 41a to be received in hot wire receiving cavity 25a, and a neutral wire 41c to be received in neutral wire receiving cavity 25c. Once received in the appropriate cavity, each wire can be secured in place and in contact with its corresponding contact blade by tightening the appropriate plastic securing screw 23, which compresses the wire against the contact blade.

As shown in FIG. 2, lamp cord housing 35 protrudes downwardly from track adaptor 3 and is designed to surround lamp cord 40, which depends from track adaptor 3. The lamp cord housing bottom portion 35b is tapered in the downward direction and is threaded to be removably attached to lamp cord housing top portion 35a, which is permanently affixed to metal housing portion 30.

Track adaptor 3 allows for a depending lamp cord 40 to be attached which provides electricity to, and may provide mechanical support for, attached line voltage light fixtures. Lamp cord 50 can also be attached to track adaptor 3 and similarly provides electricity to, and may provide mechanical support for, attached compact fluorescent light fixtures. As shown in FIGS. 2, 3, and 4, depending cable 40 contains three shielded internal electrical wires 41a, 41b, and 41c of copper or other conductive metal designed to transmit electricity to a line voltage socket 71 and any attached line voltage lamp. The three shielded internal wires are surrounded by an outer sheathing that can be made from a variety of materials, such as, but not limited to, silicon or braided aluminum. To attach depending cable 40 to track adaptor 3, metal securing screw 21 is removed and plastic housing 20 is detached from metal housing 30 by applying pressure near protruding plastic member 22 (FIG. 3) to remove it from receiving notch 36 in metal housing 30. Depending cable 40 is then cut to desired length and a portion of the outer sheathing of the depending cable is removed. The hot wire 41a, ground wire 41b, and neutral wire 41c of the cable are stripped to a length appropriate for reception in wire receiving cavities 25a, 25b, and 25c as shown in FIG. 2. Depending cable 40 is then fed through lamp cord housing 35 and electrical wires comprising the cable are looped through plastic washer 27 for strain relief. Alternatively, the wires comprising the cable can be tied into a knot to provide adequate strain relief. Then, as described above, plastic securing screws 23 are loosened or removed, allowing electrical wires 41a, 41b, and, 41c of depending cable 40 to be received in corresponding wire receiving cavities 25a, 25b, and 25c. Once inserted in the appropriate cavity, each wire 41 may be held in place and in contact with its corresponding contact blades 26a, 26b, and 26c by tightening the appropriate plastic securing screw 23. Plastic housing 20 is then reattached to metal housing 30 and metal securing screw 21 is re-inserted. The length of a cable can be shortened further by repeating the above described steps. As is apparent, track adaptor 3 will allow for easy shortening of depending cable 40, while mechanically and electrically supporting a number of line voltage light sources and accompanying accessories attached at the end of cable 40 distal from the track adaptor 3.

As shown in FIGS. 1 and 5, track adaptor 3 is also adapted to support a ballast housing 90. Ballast housing 90 encloses ballast 91 designed to allow for a compact fluorescent lamp 82 to be used as the illuminating element of a luminaire. Lamp cord housing bottom portion 35b is designed to be unscrewed from lamp cord housing top portion 35a to allow electrical ballast housing 90 to be inserted therebetween. Threaded top connecting portion 95 of electrical ballast housing 90 can then be received in lamp cord housing top portion 35a to removably connect electrical ballast housing 90 to track adaptor 3. Once electrical ballast housing 90 is attached to track adaptor 3, electrical connections of the two input wires 92a and 92c of ballast 91, which protrude from top connecting portion 95 of electrical ballast housing 90, are made to track adaptor 3. The electrical input wires 92a and 92c are received in their corresponding wire receiving cavities 25a and 25c and secured in place by tightening plastic securing screws 23 as previously described in connection with wires 41a and 41c. The two electrical wires 51a and 51c of lamp cord 50 are then fed through tapered lamp cord housing bottom portion 35b and the wires may be looped through a strain relief washer, which can be inserted in ballast housing 90 or tied in a knot to provide adequate strain relief. Appropriate electrical connections are then made between the ballast output wires 93a and 93c and electrical wires 51a and 51c, using wire nuts, electrical tape, or other known means. Once these connections are made, ballast 91 can provide appropriate electrical output to compact fluorescent socket 81 and any attached compact fluorescent lamp 82. Lamp cord housing bottom portion 35b can then be screwed into bottom connecting portion 94 of electrical ballast housing 90. In this configuration, lamp cord 50 depends from electrical ballast housing 90 and through tapered lamp cord housing bottom portion 35b, which in turn is screwed into electrical ballast housing threaded bottom connecting portion 94. If a different length is desired for lamp cord 50, the cord can be cut, the outer sheathing removed, and new connections from the lamp cord electrical wires 51a and 51c to the output wires 93a and 93c of ballast 91 can be made.

Figure 6:
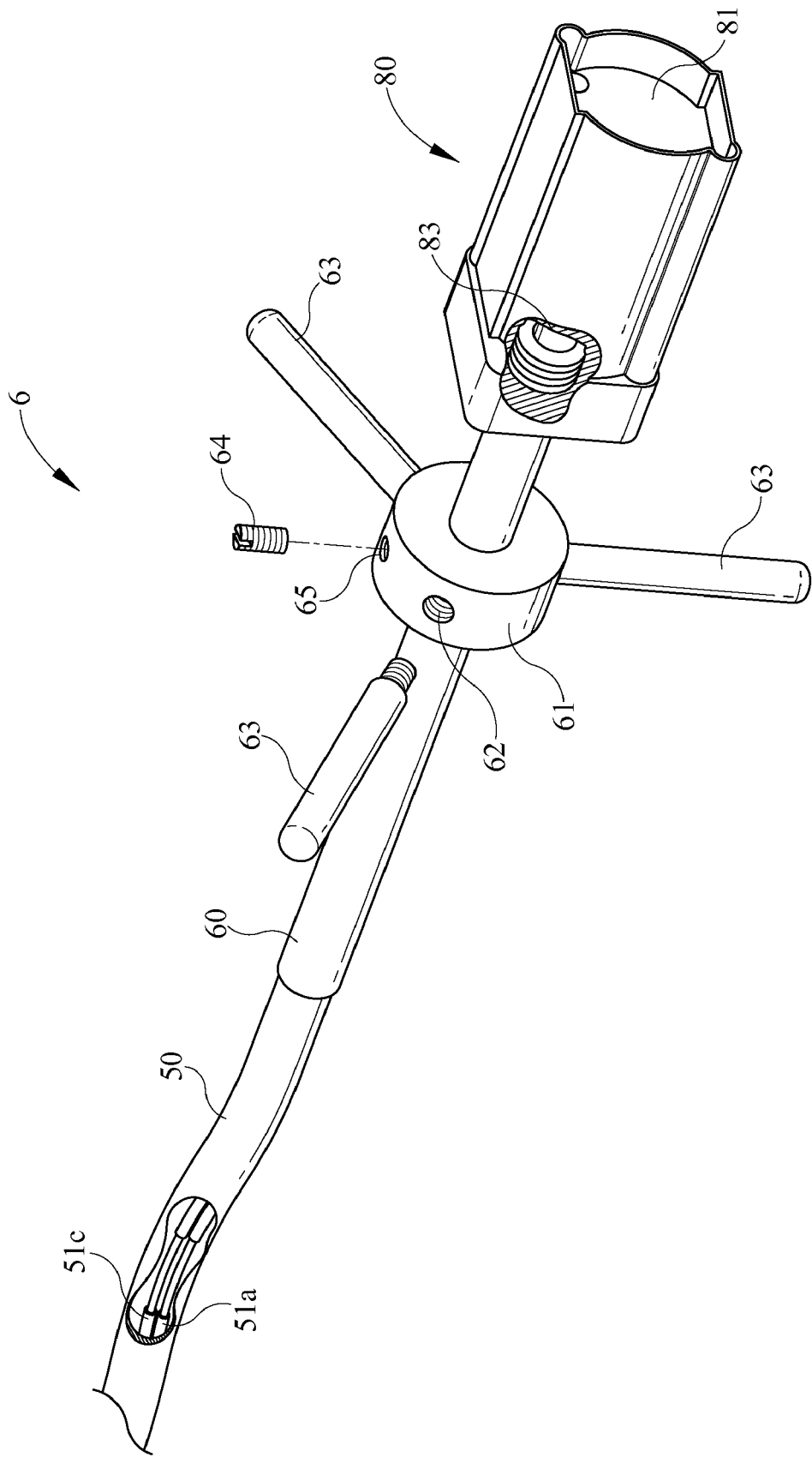
FIG. 6 is an enlarged partially exploded perspective view of the socket housing end of the compact fluorescent lamp fixture, with portions broken away.

As shown in FIGS. 1 and 6, compact fluorescent light fixture 6 has a compact fluorescent socket housing 80 and an adjustable receiving bobble 61 connected to the end of depending lamp cord 50 distal from the electrical ballast housing 90. Compact fluorescent socket housing 80 contains compact fluorescent socket 81, which is electrically connected to the internal wires of lamp cord 50 and designed to receive compact fluorescent lamp 82.

As shown in FIG. 1, line voltage light fixtures 4 and 5, similarly have a socket housing 70 containing a socket 71, which is electrically connected to the internal wires of lamp cord 40 and may be designed to receive a variety of line voltage lamps. Compact fluorescent light fixture 4 is additionally shown with an adjustable receiving bobble 61 connected to the end of depending lamp cord 50 distal from the track adaptor 3. Adjustable receiving bobble 61 can be connected to both line and compact fluorescent fixtures. Adjustable bobble 61 contains recessed screw holes 62 configured to receive shade mounting posts 63 of the type shown with regard to compact fluorescent light fixture 6. Mounting posts 63 are designed to be inserted through holes in a variety of pendant lampshades such as 8 made from materials such as, but not limited to glass, metal, and plastic. Pendant lampshade 8 can be positioned around the adjustable receiving bobble 21 with its holes aligned with recessed screw holes 62 (FIG. 6). Each mounting post 63 can then be inserted in the corresponding lampshade holes, and then screwed into recessed screw holes 62, allowing the pendant lampshade to rest on and be maintained in position by mounting posts 63. Each fixture 4, 5, and 6 is provided with a rigid tube 60 as shown in FIG. 1. As shown in FIG. 6, rigid tube 60 is designed to surround a portion of depending lamp cord 50, and is removably connected to socket housing 80 by way of being threaded into a socket housing receiving area 83 located on the top portion of socket housing 80. Rigid tube 60 may be similarly connected to line voltage fixtures such as 4 and 5. Adjustable receiving bobble 61 may be designed to slide axially along rigid tube 60 to a desired position. Receiving bobble 61 may then be fixed at any point along rigid tube 60 by tightening set screw 64 which is threadably inserted in receiving hole 65 and makes contact with rigid tube 60 when adequately tightened. This adjustment of bobble 61 allows for a pendant lampshade such as 8 or other lampshades to be placed in an optimal position with respect to lamp 82. As shown in FIG. 1 with respect to lampshade 7, it is also possible to place a variety of lampshades or pendants directly atop of adjustable receiving bobble 61, without the need for mounting posts. This can be done by disconnecting depending cable 40 or 50 and simply sliding the lampshades or pendants down cable 40 or 50 and placing them on bobble 61 with mounting posts removed. Bobble 61 can likewise be adjusted axially along rigid tube 60 in this configuration as well. Alternatively, bobble 61 can be removed altogether, and a lampshade or pendant placed directly atop socket housing 70, as illustrated by line voltage fixture 5 in FIG. 1. All of these configurations are within the scope of this invention and will function with both line voltage and compact fluorescent light fixtures.

It is understood that while certain forms of the invention have been illustrated and described, it is not limited thereto except insofar as such limitations are included in the following claims and allowable functional equivalents thereof.

I claim:

1. A track lighting system comprising:
    a track adaptor releasably connected to a track member having a depending light fixture, said light fixture having a plurality of wires in electrical communication with said track member;
    said track adaptor having a first housing releasably affixed to a second housing;
    said first housing of said track adaptor having a plurality of openings, said plurality of openings including a first opening and a second opening, said first opening having a first conductive portion and said second opening having a second conductive portion, wherein said first opening has an attachment mechanism releasably securing at least one of said plurality of wires in electrical communication with said light fixture to said first conductive portion projecting from said first housing and engaging said track member; and
    wherein said second housing includes a conductive protrusion electrically connected to said second conductive portion of said second opening.

2. The track lighting system as in claim 1 wherein each said attachment mechanism is a set screw.

3. The track lighting system as in claim 1 wherein said first housing is nonconductive.

4. The track lighting system as in claim 1 wherein said second housing is conductive and engages said track member.

5. The track lighting system as in claim 1 wherein said first housing is substantially S-shaped in cross section.

6. The track lighting system as in claim 1 wherein said plurality of wires are an adjustable depending cable supporting said light fixture.

7. The track lighting system as in claim 1 further comprising electronics for illuminating said light fixture in electrical communication with said plurality of wires.

8. The track lighting system as in claim 7 wherein said electronics for illuminating said light fixture in electrical communication with said plurality of wires is a ballast.

9. A track adaptor for attaching a light fixture to a track member of a track lighting system comprising:
    a first housing releasably affixed to a second housing;
    said first housing having a first opening, a second opening, and a third opening;
    said first opening having a first conductive portion, wherein said first conductive portion projects from said first housing, said second opening having a second conductive portion, and said third opening having a third conductive portion, wherein said third conductive portion projects from said first housing; and
    an attachment mechanism engaging said first housing with said second housing and electrically engaging said second conductive portion of said first housing to said second housing.

10. The track adaptor as in claim 9 wherein said first housing is substantially S-shaped in cross section.

11. The track adaptor as in claim 9 wherein said second housing is conductive.

12. The track adaptor as in claim 9 wherein said first housing is nonconductive.

13. The track adaptor as in claim 9 wherein each of said first opening, said second opening, and said third opening is substantially vertical.

14. The track adaptor as in claim 9 wherein said second housing projects a conductive protrusion electrically connected to said second conductive portion of said second opening.

15. The track adaptor as in claim 9 wherein each of said openings of said first housing having an attachment mechanism.

16. The track adaptor as in claim 15 wherein each said attachment mechanism is a set screw.

17. A track adaptor for attachment to a track member comprising:
    a first nonconductive housing releasably affixed to a second conductive housing;
    said first housing having a first opening, a second opening, and a third opening, each of said openings having an attachment mechanism;
    said first opening having a first conductive portion, wherein said first conductive portion projects from said first housing;
    said second opening having a second conductive portion;
    said third opening having a third conductive portion, wherein said third conductive portion projects from said first housing; and
    wherein said second housing projects a conductive protrusion electrically connected to said second conductive portion of said second opening.

18. The track adaptor as in claim 17 wherein each said attachment mechanism is a set screw.

19. The track adaptor as in claim 17 further comprising a second attachment mechanism engaging said first housing with said second housing and electrically engaging said second conductive portion of said first housing to said second housing.

20. The track adaptor as in claim 17 wherein each of said first opening, said second opening, and said third opening are substantially vertical.

21. The track adaptor as in claim 17 wherein said first housing is substantially S-shaped in cross section.

22. The track adaptor as in claim 17 wherein said first housing is nonconductive.

* * * * *